United States Patent [19]

Thompson et al.

[11] Patent Number: 5,336,719
[45] Date of Patent: Aug. 9, 1994

[54] TRANSPARENT TOUGHENED PLASTICS

[75] Inventors: Ronald J. Thompson, Enniskillen Township; James Lunt, Bright's Grove, both of Canada; John C. Lamont, Westminster; John C. Kwok, Holden, both of Mass.

[73] Assignee: Polysar Limited, Sarnia, Canada

[21] Appl. No.: 51,835

[22] Filed: Apr. 26, 1993

Related U.S. Application Data

[62] Division of Ser. No. 382,896, Jul. 21, 1989, Pat. No. 5,079,296.

[51] Int. Cl.$^5$ .............. C08L 9/02; C08L 9/06; C08L 25/12
[52] U.S. Cl. ................ 525/71; 525/77; 525/86; 525/89; 525/98; 525/99; 525/235; 525/238; 525/241
[58] Field of Search ........... 525/241, 238, 89, 95, 525/98, 99, 71, 80, 85, 71, 77, 86, 89, 98, 99, 235, 238, 241

[56] References Cited

U.S. PATENT DOCUMENTS

| | | | |
|---|---|---|---|
| 3,476,829 | 11/1969 | Gruver et al. | 260/876 |
| 3,906,057 | 9/1975 | Durst | 525/99 |
| 3,907,929 | 9/1975 | Durst | 260/876 |
| 4,145,376 | 3/1979 | Bracke et al. | 260/876 |
| 4,181,644 | 1/1980 | Lehr | 525/80 |
| 4,267,284 | 5/1981 | Kitchen | 525/99 |
| 4,294,937 | 10/1981 | Whitehead | 525/99 |
| 4,412,941 | 11/1983 | Probst et al. | 524/496 |
| 4,423,190 | 12/1983 | Fukawa et al. | 525/98 |
| 4,425,459 | 1/1984 | Fletcher | 524/371 |
| 4,467,066 | 8/1984 | Fletcher | 524/371 |

FOREIGN PATENT DOCUMENTS

| | | | |
|---|---|---|---|
| 0196013 | 10/1986 | European Pat. Off. | |
| 2448596 | 4/1975 | Fed. Rep. of Germany. | |
| 57-212249 | 6/1981 | Japan | 525/99 |
| 61-09238 | 8/1981 | Japan. | |
| 61-138656 | 12/1984 | Japan | 525/99 |

OTHER PUBLICATIONS

Chemical Abstracts vol. 97, 1982 p. 38, No. 97:7267d H. Gausepohl et al, "Thermoplastic Molding Composition".

Primary Examiner—James J. Seidleck
Assistant Examiner—W. Robinson H. Clark
Attorney, Agent, or Firm—Stevens, Davis, Miller & Mosher

[57] ABSTRACT

Tough transparent thermoplastics blends may be prepared by blending 10 to 99 weight percent of a block copolymer; 0.1 to 1 weight percent of particulate rubber having a particle size from 0.1 to 10 microns; and the balance a clear glassy polymer. These clear polymers are useful in a number of application, particularly for those applications requiring quite high toughness and transparency such as packaging, containers or protective covering.

4 Claims, 2 Drawing Sheets

TRANSPARENT TOUGHENED PLASTICS

This is a Division of application Ser. No. 07/382,896 filed Jul. 21, 1989, U.S. Pat. No. 5,079,296.

FIELD OF THE INVENTION

This invention relates to impact modified thermoplastic blends. More particularly this invention relates to impact modified thermoplastic blends having a transparency of not less than 80 percent as measured on sheet material 0.040 inches (about 1 mm) thick. Such material is useful in a number of applications For example the blends may be used for lids for yogurt containers having a metal foil closure or for containers with snap top lids and in clear drinking glasses such as those used at sports stadiums or on airplanes and the like.

BACKGROUND OF THE INVENTION

General purpose polystyrene is used in a number the above applications. While general purpose polystyrene has a high transparency, it is brittle and has a low falling dart resistance. Additionally, it fails a crush test in which a thermoformed cup is sealed over a vacuum source. There is a mandril inside the cup to prevent complete collapse. The cup is exposed to 28" of Mercury vacuum.

The cup is observed to see if it collapses or cracks. The percent of the cups which fail or collapse and which pass is recorded.

High impact polystyrene (HIPS) is known and used in some of these applications. Cups made of HIPS pass the crush test. Unfortunately, HIPS has a low transparency, as measured on a sheet 0.040" thick, in the order of 40–50 percent.

U.S. Pat. No. 4,145,376 issued Mar. 20, 1979 to Labofina discloses a blend comprising polystyrene, a rubbery polymer such as polybutadiene and a sequenced polymer, The total amount of rubbery material in the blend is from 1 to 50 weight percent of the blend. The sequenced copolymer is used in an amount to provide from 3 to 90 weight percent of the total rubbery composition. The compositions of the present invention contain a sequenced polymer in an amount to provide over about 97 weight percent of the rubber material in the blend. The composition of the Labofina patent are opaque whereas the compositions made in accordance with the present invention have a transparency of at least 80 percent, preferably 90 percent most preferably over 95 percent.

Blends of polystyrene and radial block copolymers are known. These blends are described, for example in U.S. Pat. No. 4,467,066 issued Aug. 4, 1984 to Shell Oil Company. While these blends have a high clarity and toughness, cups made of about 50/50 blends of polystyrene and radial block copolymer do not pass the crush test. If the amount of radial block copolymer is increased the blend loses its stiffness.

Chemical Abstract 97:7267d of European Patent Application 48388 filed Mar. 12, 1982, in the name of BASF A.G., discloses a blend of 20–95 weight percent of an impact modified vinyl arene and a 1,3-diene; and 5–80 weight percent of a star-block copolymer comprising 55–80 parts of a vinyl arene and 20–45 parts of a 1,3-diene. The polymer blend has a good gloss and improved tensile strength. The exemplified blend, 90 percent impact modified styrene and 10 percent star-block copolymer would not have the high transparency required in the present invention. Furthermore, the blend of the reference contains a minimum of 20 percent of an impact copolymer of a vinyl arene and a diolefin. The impact modified copolymer, at the level at which it is used in the reference and the level of 1,3diene in impact modified copolymer of about 6 percent would contribute more particulate impact modifier than is required in the present invention. Furthermore, the abstract is silent on particle size distribution of the impact modifier.

Applicants have discovered novel thermoplastic blends which have a high resistance to impact, and good clarity. This is unexpected in view of the extremely low level of impact modifier present in the blend.

SUMMARY OF THE INVENTION

The present invention provides an impact modified thermoplastic polymer blend having a transparency of not less than 80 percent as measured using sheet material 0.040 inches thick comprising:
  i) from 10 to 99 weight percent of a transparent block copolymer which when blended with one or more clear glassy polymers gives a transparent blend,
  ii) from 0.01 to 1 weight percent of a rubber in particulate form having a volume moment average particle diameter from 0.1 to 10 microns; and
  iii) the balance said one or more clear glassy polymers.

The present invention also provides a thin walled article from the above composition said article having a wall thickness from 0.10 to 0.50 inches (0.25 mm to 12.0 mm) preferably 0.010 to 0.25 inches (0.25 to 0.5 mm) thick.

DETAILED DESCRIPTION

Figure 1:
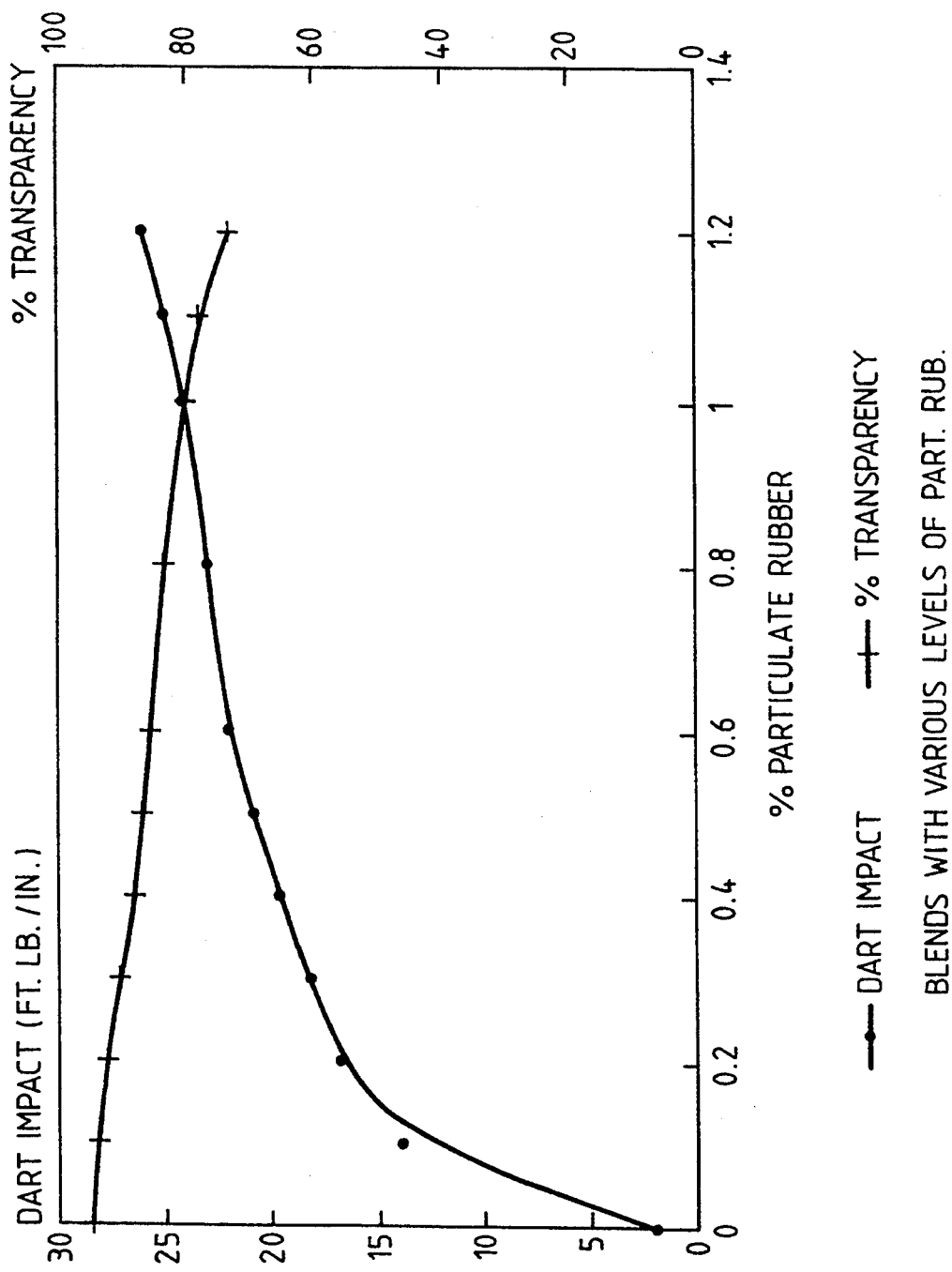
FIGS. 1 is a plot of curve developed based on a regression analysis of data, showing the falling dart impact (ft. lb./inch) and transparency as a function of weight percent particulate rubber.

The thermoplastic blends of the present invention have a transparency of not less than 80, preferably not less than 95 percent when measured in sheet form, having a thickness of not greater than 0.040 inches (1 mm).

As used in this specification the term glassy polymer means a polymer which is hard at room temperature (e.g. has a Tg greater than 22° C.).

The clear glassy polymer may be a homopolymer or a copolymer or miscible blends of such co or homopolymers. Generally the clear glassy polymer may be selected from the group consisting of:
  (i) poly $C_{8-12}$ vinyl aromatic polymers;
  (ii) copolymers comprising 70 to 90 weight percent of a $C_{8-12}$ vinyl aromatic monomer and 30 to 10 weight percent of a $C_{3-6}$ alkenyl nitrile monomer;
  (iii) styrene acrylates;
  (iv) polyphenylene ethers;
  (v) polyphenylene sulfides;
  (vi) polysulfones; and
  (vii) polycarbonates. Typically clear glassy polymers include polystyrene, styrene-alkenyl nitriles (e.g. SAN), polyphenylene ethers, polyphenylene sulfides, polysulfones and polycarbonates. The glassy polymer may comprise one or more polymers selected from the group consisting of:

(i) homopolymers of $C_{8-12}$ vinyl aromatic monomers which are unsubstituted or substituted by a $C_{1-4}$ alkyl radical;

(ii) copolymers comprising 50 to 90 weight percent of one or more $C_{8-12}$ vinyl aromatic monomers which are unsubstituted or substituted by a $C_{1-4}$ alkyl radical and 10 to 50 weight percent of one or more $C_{1-4}$ alkyl esters of acrylic or methacrylic acid;

iii) copolymers comprising 70 to 90 weight percent of one or more $C_{8-12}$ vinyl aromatic monomers which are unsubstituted or substituted by a $C_{1-4}$ alkyl radical and 30 to 10 weight percent of a $C_{3-6}$ alkenyl nitrile monomer;

iv) polymers having a backbone of the formula

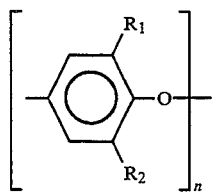

I wherein $R_1$ and $R_2$ are independently selected from the group consisting of a hydrogen atom, a chlorine atom, $C_{1-4}$ alkyl radicals and a $C_{6-10}$ aromatic radical which is unsubstituted or substituted by a $C_{1-4}$ alkyl radical; and n is an integer from 300 to 700;

v) polymers having a backbone of formula

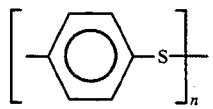

II wherein n is an integer of at least 250;

vi) polymers having a molecular weight from about 30,000 to 100,000, preferably from about 40,000 to 60,000 having as the backbone one or more recurring units selected from the group consisting of:

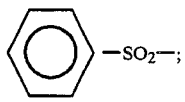

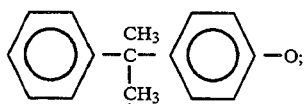

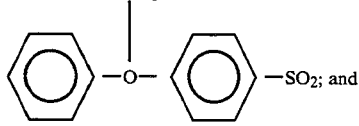

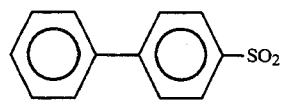

vii) one or more homo-and co-polycarbonates which are based on one or more poly phenols selected from the group consisting of hydroquinone, resorcinol, and polyphenols of the formula.

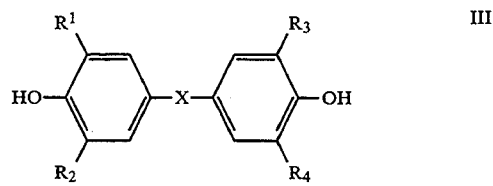

III wherein $R_1$ $R_2$, $R_3$ and $R_4$; are independently selected from the group consisting of a hydrogen atom, a chlorine atom, a bromine atom, and a $C_{1-4}$ alkyl radical; and X is a bond or divalent radical selected from the group consisting of $C_{1-10}$ alkylene radicals; $C_{2-8}$ alkenylene radicals, and $C_{6-8}$ cycloalkylene radicals.

If the clear glassy polymer is added as a separate component, typically the glassy polymer is used in the blend in an amount from about 10 to 90, preferably 20 to 70, most preferably from 40 to 60 weight percent.

Some $C_{8-12}$ vinyl aromatic monomers include styrene, alpha methyl styrene, para methylstyrene and para tertiary butyl styrene. Polystyrene is a particularly useful polymer.

$C_{1-4}$ alkyl esters of acrylic and methacrylic acid include methyl methacrylate, ethyl methacrylate, methyl acrylate, ethyl acrylate and butyl acrylate. Preferably the acrylate polymers are homopolymers of methyl methacrylate, ethyl acrylate and copolymers of methyl methacrylate and ethyl acrylate.

$C_{3-6}$ alkenyl nitriles include acrylonitrile and methacrylonitrile.

The block copolymer in the thermoplastic blend is a block copolymer which when blended with a clear glassy polymer gives a transparent blend, The block copolymer may be a block copolymer of a vinyl aromatic block polymer and a conjugated diolefin block polymer; an acrylic block polymer and a conjugated diolefin block polymer; a vinyl aromatic block polymer and an acrylic block polymer; and a block of a vinyl aromatic acrylate polymer )(e.g. styrene-methyl(meth-)acrylate-butyl acrylate) and a rubbery acrylate block (e.g. butyl acrylate homopolymer). The block copolymer may comprise at least one block polymer of one or more $C_{4-6}$ conjugated diolefins and at least one block of one or more $C_{8-12}$ vinyl aromatic monomers which are unsubstituted or substituted by a $C_{1-4}$ alkyl radical. Preferably the block copolymer comprises from 60 to 85, most preferably from 70 to 80 weight percent of a poly vinyl aromatic monomer and from 40 to 15 most preferably from 30 to 20 weight percent of a poly $C_{4-6}$ conjugated diolefin which is unsubstituted or substituted by a chlorine atom. The block copolymer may be a radial block copolymer. Useful vinyl aromatic monomers include styrene, alpha methyl styrene, para methylstyrene and para tertiary butyl styrene. A particularly useful vinyl aromatic is styrene. The conjugated diolefin may be unsubstituted or substituted by a chlorine atom. Particularly useful conjugated diolefins include butadiene and isoprene.

Radial block copolymers are; commercially available; for example those sold by Phillips under the tradename "KR". The methods for preparing such resins are disclosed in the literature. The resins are produced by a sequential anionic polymerization using for example a lithium based catalyst.

The blends according to the present invention must contain rubber in a particulate form having a volume moment average particle diameter from 0.1 to 10 microns as defined by statistical equation $$\frac{\Sigma_i n_i d_i^4}{\Sigma_i n_i d_i^3}$$

wherein ni is the number of particles in the diameter class di of the sample. (Allen T., Particle Size Measurement, Chapman and Hall 1974)

The rubber in particulate form may have a particle size from 0.1 to 10, preferably from 0.2 to 3, most preferably from 0.3 to 1.5 microns.

The rubber particles may be introduced into the blends of the present invention in the following ways. It may be a powder derived from a latex of a rubber polymer onto which has been grafted a polymer which is compatible with a glassy polymer. It may be in the form of a particulate toughened thermoplastic in which the particles are in the form of grafted and/or occluded rubber particles such as high impact polystyrene (HIPS); ABS (both emulsion and bulk) or analogous toughened acrylates such as ZYLAR resin sold by Polysar. The thermoplastic may be a clear glassy polymer, as defined above, or it may be present merely as a carrier for the particulate material provided it does not reduce the transparency of the blend to below 80 percent, more preferably to not below 90 percent, most preferably to not below 95 percent.

The rubber polymer within these particles may be selected from the group of polymers consisting of (i) homopolymers of $C_{4-6}$ conjugated diolefins which are unsubstituted or substituted by a chlorine atom;

(ii) homogeneous homo- and copolymers of $C_{4-8}$ alkyl esters of acrylic and methacrylic acid which homo- and copolymers have a Tg less than 20° C.;

(iii) heterogeneous polymers comprising 40 to 60 weight percent of a first domain comprising 100 to 70 weight percent of one or more $C_{4-8}$ acrylate or methacrylate esters which form homopolymers having a Tg less than 0° C., and from 0 to 30 weight percent of one or more monomers selected from the group consisting of methyl acrylate, ethyl acrylate, methyl methacrylate and ethyl methacrylate; and from 60 to 40 weight percent of a subsequent domain comprising a homopolymer or a copolymer of one or more monomers selected from the group consisting of methyl acrylate, ethyl acrylate, methyl methacrylate, and ethyl methacrylate;

(iv) linear and radial block copolymers having a molecular weight of at least 75,000 and a styrene content from 20 to 50 weight percent selected from the group consisting of styrene-butadiene diblock copolymers, styrene-butadiene-styrene triblock copolymers, styrene-isoprene diblock copolymers, styrene-isoprene-styrene triblock copolymers, partially hydrogenated styrene-butadiene-styrene triblock copolymers, and partially hydrogenated styrene-isoprene-styrene triblock copolymers;

(v) copolymers comprising 100–60 weight percent of a $C_{4-6}$ conjugated diolefin and 0–40 weight percent of one or more monomers selected from the group consisting of $C_{2-6}$ alkenyl nitrile monomers, $C_{8-12}$ vinyl aromatic monomers; $C_{1-4}$ alkyl esters of acrylic acid; $C_{1-4}$ esters of methacrylic acid.

If the rubber is a poly $C_{4-6}$ conjugated diolefin it is preferably in the cis- configuration. Typically the polymer will contain at least about 55 more preferably at least 95, most preferably at least 98 weight percent of the polymer in the cis- configuration.

The rubber particles may be incorporated in the blend in the form of high impact polystryene, an impact modified acrylate or a graft copolymer.

Typically high impact polystyrene comprises from 90 to 95 weight percent of one or more $C_{8-12}$ vinyl aromatic monomers, preferably polystyrene and from 5 to 10 most preferably about 6 weight percent of a cis- poly $C_{4-6}$ conjugated diolefin which is unsubstituted or substituted by a chlorine atom. Suitable cis- conjugated diolefins contain at least about 55 percent, preferably greater than 95, most preferably about 98 percent of the monomer units in a cis- configuration. The remaining monomer units in the conjugated diolefin are in the trans configuration or are in a vinyl configuration.

These polymers are well known in the industry. The impact polystyrene is prepared by dissolving the cis-$C_{4-6}$ polybutadiene in styrene monomer. The styrene is then polymerized.

The rubber particles may be incorporated in the blend in the form of an impact modified styrene acrylate comprising from 0.1 to 10 weight percent of a cis- polymer of one or more $C_{1-4}$ conjugated diolefins which are unsubstituted or substituted by a chlorine atom onto which is grafted a copolymer comprising: from 10 to 50 weight percent of one or more acrylate or methacrylate esters which form homopolymers having a Tg greater than 35° C.; from 50 to 90 preferably from 70 to 90 weight percent of one or more $C_{8-12}$ vinyl aromatic monomers which are unsubstituted or substituted by a $C_{1-4}$ alkyl radical; and from 0 to 9.9 weight percent of one or more acrylate or methacrylate esters which form homopolymers having a Tg greater than 20° C.

Such impact modified acrylates may be prepared by conventional bulk polymerization in which the rubber is dissolved in the monomers and the monomers are subsequently polymerized. Alternately the polymer may be prepared by a suspension process in which a latex of the rubber is added to an aqueous suspension of the monomers prior to or during polymerization.

Useful vinyl aromatic monomers have been discussed above. Acrylate and methacrylate esters which form homopolymers having a Tg greater than 35° C. include methyl methacrylate, ethyl methacrylate, and t-butyl acrylate. acrylate and methacrylate esters which form homopolymers having a Tg less than 20° C. include ethyl acrylate, propyl acrylate, butyl acrylate and ethyl hexyl acrylate.

Useful rubbery substrates for the impact modified acrylates and methacrylate copolymers include cis-polymers of $C_{4-6}$ conjugated diolefins. A suitable rubber includes cis-polybutadiene. This polymer has been discussed above.

The particulate rubber may be incorporated in an acrylate homopolymer comprising 60 to 99.5 weight percent of a matrix of a polymer formed from one or more monomers selected from the group consisting of a $C_{1-2}$ alkyl esters of acrylic or methacrylic acid, having dispersed therein from 0.5 to 40 weight percent of a soft acrylic such as butyl acrylate. Such a polymer is disclosed in Canadian Patent 901,397 issued May 30, 1972 to Rohm & Haas Company (Dunkelberger). The impact modified acrylic polymer may comprise a glassy matrix as described above having dispersed through the matrix a core/shell acrylate polymer comprising 40 to 60 weight percent of a first domain, such as a core which is an acrylate polymer having a Tg less than −20° C., such as a butyl acrylate homopolymer or a butyl acrylate copolymer which may contain up to 30, preferably less than 15 weight percent of one or more monomers selected from the group consisting of methyl acrylate, ethyl acrylate, methyl methacrylate and ethyl methacrylate and 60 to 40 weight percent of a subsequent domain, such as a shell which is an acrylate polymer having a Tg greater than 20° C. preferably from about 35° C. to 60° C. Such heterogeneous polymers typically have a subsequent or second domain of one or more monomers selected from the group consisting of methyl methacrylate, ethyl methacrylate, methyl acrylate and ethyl acrylate.

The particulate rubber may be incorporated in the blend in the form of a styrene-acrylate graft copolymer. Such a graft copolymer may comprise:

from 2 to 20, preferably 4 to 12 parts by weight o f linear and radial di and tri block copolymers having a molecular weight of not less than 75,000, preferably from 175,000 to 275,000 and a styrene content of from 20 to 50 weight percent selected from the group consisting of styrene-butadiene-diblock copolymers, styrene-butadiene-styrene triblock copolymers, partially hydrogenated styrene-butadiene-styrene triblock copolymers, and partially hydrogenated styrene-isoprene-styrene triblock copolymers onto which has been grafted a polymer comprising: from 50 to 75, preferably 50 to 65 parts by weight of a $C_{8-12}$ vinyl aromatic monomer which is unsubstituted or substituted at the vinyl radical by a $C_{1-2}$ alkyl radical and which is unsubstituted or substituted in the aromatic ring by up to two substitutents selected from the group consisting of $C_{1-4}$ alkyl radicals;

ii) from 7 to 30, preferably from 8 to 20 parts by weight of a $C_{1-8}$ alkyl or hydroxy alkyl ester of a $C_{3-6}$ ethylenically unsaturated carboxylic acid which forms a homopolymer having a Tg less than 20° C.;

iii) from 10 to 50, preferably 15 to 40 parts by weight of methyl methacrylate.

The impact modifier may be introduced into the blend in the form of an impact modified polymer comprising:

from 10 to 5 weight percent of a copolymer comprising 100–60 weight percent of a $C_{4-6}$ conjugated diolefin and 0–40 weight percent of at least one monomer selected from the group consisting of $C_{3-6}$ alkenyl nitrile monomers; $C_{8-12}$ vinyl aromatic monomers $C_{1-4}$ alkyl esters of acrylic acid and $C_{1-4}$ alkyl esters of methacrylic acid onto which has been grafted 90 to 95 weight percent of a copolymer comprising 70 to 90 weight percent of a $C_{8-12}$ vinyl aromatic monomer which is unsubstituted or substituted by a $C_{1-4}$ alkyl radical 30 to 10 weight percent of a $C_{3-6}$ alkenyl nitrile.

These polymers are typically referred to as ABS resins. When using ABS care should be taken in selecting the clear glassy polymer if present. Preferably the ABS is used with a styrene-acrylonitrile (SAN) polymer. However, simple testing may be carried out to determine the transparency of the blend.

The thermoplastic blends of the present invention may be prepared by tumble blending, the block copolymer, the rubber particles and the clear glassy polymer in the required proportions. The resulting blend may then be extruded in sheet form. The resulting sheet may then be thermoformed or blow molded. Alternately, the blend may be extruded as strands and chopped to length. The resulting pellets may then be injection molded or injection blow molded to form the required article.

The temperatures during processing are easily determined by non inventive testing known to these skilled in the art.

The thermoplastic blends of the present invention may be used to make a variety of articles including thermoformed articles; thermoformed, blow molded or injection molded articles which may be thin walled. As used in this specification the word thin walled article is used for simplicity. It is intended that this word includes sheet material, drinking glasses, bowls, lids, trays and other articles The blend may be extruded, as a sheet, in the case of disposable articles. The extruded sheet may then be heated and thermoformed or pressure formed. The heated sheet is placed over a female die which is connected to a vacuum. The sheet may be urged into place with a male die then optionally a vacuum is applied. The sheet material is drawn into the die and conforms with the interior die surface or pressure may be applied by the male mold to force the thermoplastic to conform with the interior of the mold. The wall thickness is usually less than that of the sheet due to the elongation of the plastic as it conforms to the interior die surface. Typically the molded pare would have a wall thickness less than 0.5 inches (13 mm) preferably from about 0.50 (13 mm) to about 0.10 inches (25 mm), most preferably in the range from 0.25 (5 mm) to 0.10 inches (25 mm) Alternately the blends of the present invention may be injection molded or blow molded.

The formed product then leaves the mold and excess material is trimmed from the product.

The thermoplastics of the present invention may be used to manufacture a number of articles, such as clear lids on tamper proof food containers, such as yogurt cups; clear lids for prepackaged foods served on airplanes, trains and the like, and drinking cups.

In sheet form the blends of the present invention may be used over windows or lights as signs, etc. The sheet material may be injection blow molded to form bottles, or thermoformed or press molded to form cups.

The following examples are intended to illustrate the invention and not to limit it. In the examples, unless otherwise indicated parts are parts by weight (e.g. grams).

EXAMPLE I

As a comparative example a blend of material, accordance with U.S. 4,145,376 was prepared. The blend comprised:

| | |
|---|---|
| Polystyrene: sold under the trademark POLYSAR. The grade was 210. | 88 g |
| Radial Block copolymer of Styrene-Butadiene (K resin sold under the tradename KR-05—about 75 percent Styrene) | 3 g |
| Cis-polybutadiene (sold under the trademark TAKTENE 1202). | 9 g |

The blend was compounded using a Haake mixer at 210° C./70 rpm for 5 min. The resulting product was compression molded as a sheet 0.027 inches thick. The transparency of the sheet measured using a Datacolour Elrephro 200 was 47 percent (transparency obtained by measuring percent opacity and subtracting from 100).

This demonstrates that the blends of U.S. Pat. No. 4,145,376 do not have the high transparency of the blends of the present invention.

EXAMPLE II

In the examples the following polymers were used:
i) polystyrene sold under the Trademark POLYSAR. The grade number is 210. This is a medium flow injection molding and extrusion grade of polystyrene having a typical tensile yield as determined by ASTM D638 of 6000 psi;
ii) radial block styrene-butadiene copolymers having a styrene content of about 75 weight percent sold by Phillips under the tradename KR;
iii) particulate rubber incorporated as impact modified polystyrene containing 6 weight percent cis-polybutadiene having a volume moment average diameter from 0.3 to 1.5 microns produced by Polysar Limited under the experimental grade number 2172.

Blends were prepared by tumble blending or extrusion compounding co give pellets. The dry or extruded blend was then extruded as a sheet 0.040 inches (1 mm) thick. The sheet was then thermoformed into a cup. The excess sheet material was trimmed from the cup. The cup was then subjected to a vacuum crush test. The cup is placed over a vacuum source with a material inside to prevent complete collapse of the cup. The cup is clamped into place on a seal to prevent air leaks. The vacuum is applied to 28" of Mercury. The cups pass if they do not crack or collapse. The cups fail if they crack, collapse, or implode. The percent of cups which pass or fail was measured.

In addition to the above tests the sheet material was subjected to a falling dart test (ASTM No. D-3029G) and the transparency of the sheet was measured using a Datacolour Elrephro 200.

The compositions and the results are set out in table 1.

TABLE I

| Composition | Cup Crush Test | Falling Dart Impact Ft. lb./in. | Transparency % | Elongation % (Transverse direction) |
| --- | --- | --- | --- | --- |
| polystyrene | 100% fail | — | 99 | |
| Polystyrene Radial Block copolymer 50:50 | 100% fail | 1.7 | 95 | 47.3 |
| Polystyrene: Radial Block copolymer: rubber particles 54.8:44.5:0.7 | 100% pass | 27.5 | 87 | 103 |
| Polystyrene Radial block copolymer: rubber particles 50.04:49.45:0.06 | 100% pass | 15.0 | 95 | 63.6 |
| Impact Polystyrene | 100% pass | 47.5 | 48 | 27 |

These results show that the blends of the present invention have unique properties in their ability to provide a high degree of toughness while maintaining essentially the same transparency.

EXAMPLE III

The same polymers that were used in Example II were blended in a series of ratios. The blends comprised:
i) 50 percent of a radial block copolymer having a styrene content of about 75 weight percent sold by Philips under the tradenames KR-05 to KR-04 (which are similar to KR-03, KR-02 and KR-01).
ii) 0.3; 0.6; 0.9; 1.0 parts of an high C is rubber having a volume moment average diameter from 0.3 to 1.5 microns present in an amount of 6 percent of weight of a high impact polystyrene produced by Polysar Limited under the experimental designation 2172. (This corresponds to high impact polystyrene content of 5, 10, 15 and 18 weight percent.)
iii) the balance to bring the composition to 100 weight percent of polystyrene sold under the trademark POLYSAR grade 210.

The blends were extruded to give pellets and then extruded as sheet material 0.040 inches(1 mm) thick. The falling dart impact of the samples, was determined using ASTM D-30296. The transparency of the sheet was determined use a Datacolour Elrephro 200. The results were then fitted to a curve using a regression analysis and the resulting curve plotted in FIG. 1.

EXAMPLE IV

A blend of the materials referred to in Example II was prepared. The blend comprised:
50 percent of a radical block copolymer having a styrene content of about 75 weight percent sold by Phillips under the tradename KR-05;
0.2 weight percent of particulate cis-polybutadiene having a volume moment average diameter from 0.3 to 1.5 microns present in an amount of 6 percent by weight of a high impact polystyrene produced by Polysar Limited under the experimental designation 2172; (corresponding to a HIPS content of 3.3 weight percent); and
The balance to bring the composition to 100 weight percent polystyrene sold under the trademark POLYSAR grade 210.

Figure 2:
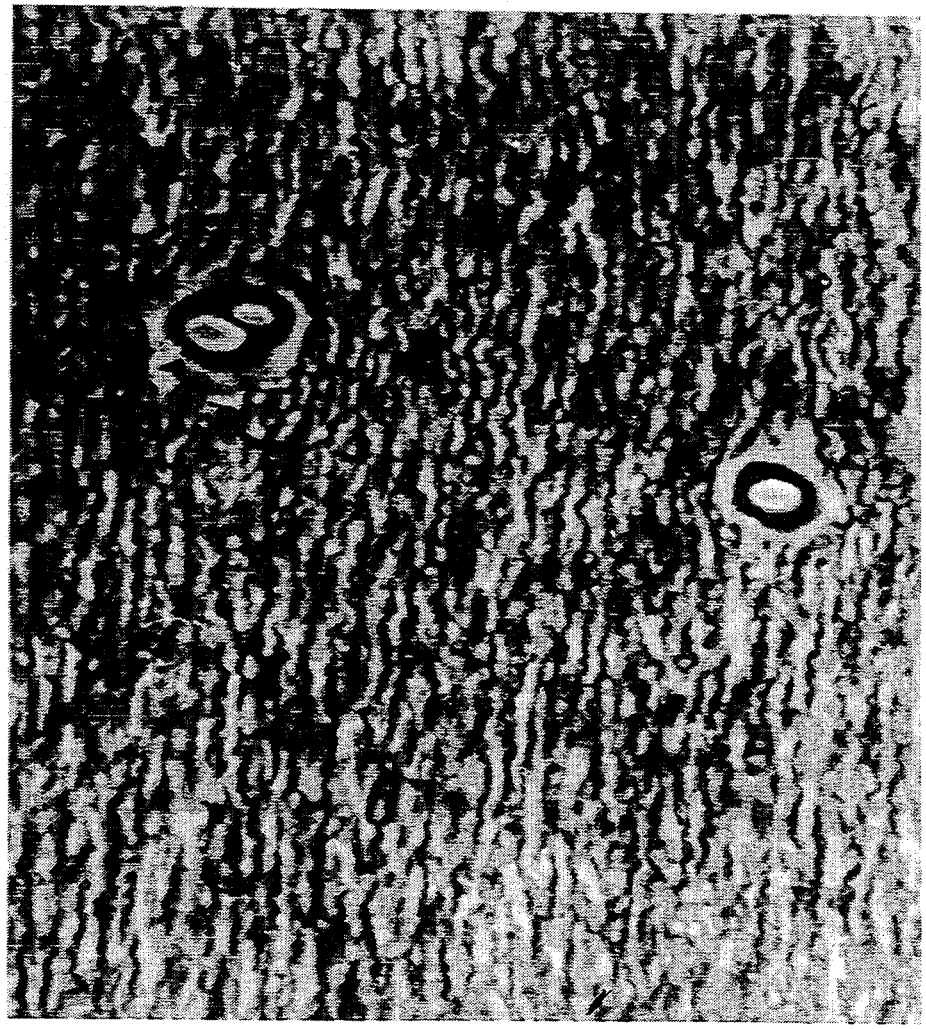
FIG. 2 is an electron micrograph of a blend of the present invention comprising 50 percent of a radial block copolymer comprising 75 percent styrene; 0.2 percent of cis-polybutadiene and the balance polystyrene.

The resulting sample has a transparency of 93.2 percent; an elongation in the transverse direction of 57.6 percent and a falling dart impact of 12.7/ft. lb./inch. An electron micrograph (Mag 65,547 X; $OsO_4$ stain) was taken of a portion of the blend. FIG. 2 is a copy of the electron micrograph. Without wishing to be bound by theory in the figure the wavy lines portion of the matrix is attributed to the radial block copolymer-polystyrene blend. The circular domains are attributed to the polybutadiene particles. It is believed that the clear area around the particles is a polystyrene domain. It is also believed that the normal polybutadiene domains having occluded polystyrene, in HIPS, have been partially dispersed in the blend giving rise to the single or small groups of rubber particles shown in FIG. 2.

EXAMPLE V

A further series of blends were prepared. In the blends the following materials were used.
SAN - Dow Styrene acrylonitrile copolymer sold under the tradename TYRIL 860.
ABS - Dow acrylonitrile butadiene styrene polymer containing about 6 percent of occluded polybutadiene having a particle size of about 1 micron.

77-5- Styrene acrylate comprising about 20 percent methyl methacrylate and about 80 percent styrene which is suspension polymerized in the presence of a sufficient amount of a polybutadiene latex to provide a rubber content of 0.5 percent.

77-3- a styrene acrylate comprising about 20 percent methyl methacrylate and about 80 percent styrene which is polymerized in the presence of a sufficient amount of a polybutadiene latex to provide a rubber content o f 0.1 percent.

ZYLAR 92 a polymer comprising about 50 percent Resin Styrene about 30 percent methyl methacrylate about 6 percent butyl acrylate grafted onto an styrene-butadiene block copolymer.

Polystyrene - the polystyrene of example II

506 - a styrene acrylic about 78:22 (no impact modifier) sold by the Plastics Group of Polysar Inc. under the trade mark POLYSAR grade 506.

HIPS - high impact polystyrene of Example II.

PPO - 2,6 dimethyl polyphenylene ether (sometimes referred to as PPO) from General Electric The blends were prepared and tested for transmission and falling dart impact as described above. The compositions as the results are set forth in table II. * trademark

TABLE II

| Composition | Transparency Percent | Falling Dart Impact Ft lb./inch |
|---|---|---|
| 1) SAN 50%<br>ABS 1.1%<br>Block copolymer 48.9% | 92 | 14.6 |
| 2) (control see 1)<br>SAN 50%<br>Block copolymer 50% | 96 | 1.4 |
| 3) 77-3 50%<br>Block copolymer 50% | 96 | 137.8 |
| 4) 77-5 50%<br>Block copolymer 50% | 96 | 56.8 |
| 5) Polystyrene 50%<br>ZYLAR 90 1.1%<br>Block copolymer 48.9% | 88 | 2.7 |
| 6) Polystyrene 50%<br>ZYLAR 92 1.1%<br>Block copolymer 48.9% | 91 | 1.4 |
| 7) (control see 3 or 4)<br>506 50%<br>Block copolymer 50% | 98 | 10.5 |
| 8) (control Ex. II, 5 & 6)<br>Polystyrene 50%<br>Block copolymer 50% | 96 | 1.3 |
| 9) (control 11) | 82 | — |
| PPO 50%<br>Block copolymer 50% | | |
| 10) PPO 50%<br>HIPS 1.1%<br>Block copolymer 48.9% | 80 | — |

What is claimed is:

1. An impact modified thermoplastic polymer blend having a transparency of not less than 90% as measured using sheet material 0.0040 inches thick comprising:
   (i) from 50 to 39.9 weight % of at least one transparent block copolymer comprising:
      (a) from 60 to 85 weight % of at least one block of at least one $C_{8-12}$ vinyl aromatic monomer; and
      (b) from 40 to 15 weight % of at least one $C_{4-6}$ conjugated diolefin,
   which transparent block copolymer when blended with one or more clear glassy polymers of component iii) below gives a transparent blend;
   (ii) from 0.1 to 10 weight % of a rubbery polymer comprising 100–60 weight % of a conjugated diolefin and 0–40 weight % of one or more monomers selected from the group consisting of $C_{2-6}$ alkenyl nitrile monomers and styrene,
   which rubbery polymer is in a particulate form having a volume moment average particle diameter from 0.1 to 0.3 microns; and
   (iii) from 40 to 60 weight % of a clear glassy polymer comprising:
      (a) from 70 to 90 weight % of one or more $C_{8-12}$ vinyl aromatic monomers; and
      (b) from 30 to 10 weight % of a $C_{3-6}$ alkenyl nitrile monomer, wherein said rubbery polymer is introduced into the blend in the form of an impact modified glassy polymer of component (iii) above comprising from 0.1 to 20 weight % of said rubber in particulate form and from 99.9 to 80 weight % of said clear glassy polymer.

2. The polymer blend according to claim 1 wherein said block copolymer comprises from 70 to 80 weight % of styrene and from 30 to 20 weight % of butadiene.

3. The polymer blend according to claim 2 wherein in said glassy polymer said vinyl aromatic is styrene and said $C_{3-6}$ alkenyl nitrile is selected from the group consisting of acrylonitrile and methacrylonitrile.

4. The polymer blend according to claim 3 wherein said rubber has a volume moment average diameter from 0.5 to 1.5 microns.

* * * * *